United States Patent
Shi et al.

(10) Patent No.: US 9,620,155 B2
(45) Date of Patent: Apr. 11, 2017

(54) DISC DRIVE ACTUATOR BEARING CARTRIDGE ASSEMBLY WITH TEMPERATURE INDUCED ROTATIONAL TORQUE MITIGATION

(71) Applicant: Seagate Technology LLC, Cupertino, CA (US)

(72) Inventors: Zheng Shi, Shakopee, MN (US); Glenn A. Benson, Lakeville, MN (US); Jeffrey Robert Lind, Robbinsdale, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/807,546

(22) Filed: Jul. 23, 2015

(65) Prior Publication Data
US 2017/0025137 A1    Jan. 26, 2017

(51) Int. Cl.
*G11B 5/48* (2006.01)

(52) U.S. Cl.
CPC ................. *G11B 5/4813* (2013.01)

(58) Field of Classification Search
CPC .......... G11B 5/48; G11B 5/4813; G11B 21/08
USPC ..................... 360/265–265.9, 99.08
See application file for complete search history.

(56) References Cited

U.S. PATENT DOCUMENTS

| 5,315,465 | A | 5/1994 | Blanks | |
|---|---|---|---|---|
| 5,628,571 | A | 5/1997 | Ohta et al. | |
| 5,751,519 | A * | 5/1998 | Hata | G11B 5/4813 360/265.6 |
| 6,038,105 | A | 3/2000 | Wood et al. | |
| 8,363,359 | B2 * | 1/2013 | Slayne | F16C 27/04 360/265.6 |
| 2002/0047394 | A1 * | 4/2002 | Obara | F16C 19/08 310/90 |
| 2004/0246627 | A1 | 12/2004 | Durrum et al. | |
| 2005/0146809 | A1 * | 7/2005 | Aoyagi | G11B 5/4813 360/265.6 |
| 2009/0279211 | A1 * | 11/2009 | Seymour | G11B 5/4813 360/265.6 |

* cited by examiner

*Primary Examiner* — Allen T Cao
(74) *Attorney, Agent, or Firm* — Crawford Maunu PLLC

(57) ABSTRACT

Various aspects of the present disclosure are directed toward a disc drive actuator assembly including an e-block, a bearing, and a sleeve. The bearing includes an inner race, an outer race and a plurality of balls between the inner and outer races. The inner race being coupled to a pivot shaft of a disc drive, and the bearing being configured and arranged to facilitate rotation of the e-block around the pivot shaft. The sleeve coupling the outer race of the bearing to the e-block, and includes a groove along an inner diameter of the sleeve adjacent the outer race. The groove and outer race mitigate rotational torque changes due to thermal effects upon the disc drive actuator assembly by allowing the outer race of the bearing to deform into or away from the groove and therein mitigate or prevent the generation of certain forces in bearings.

20 Claims, 3 Drawing Sheets

SECTION A-A

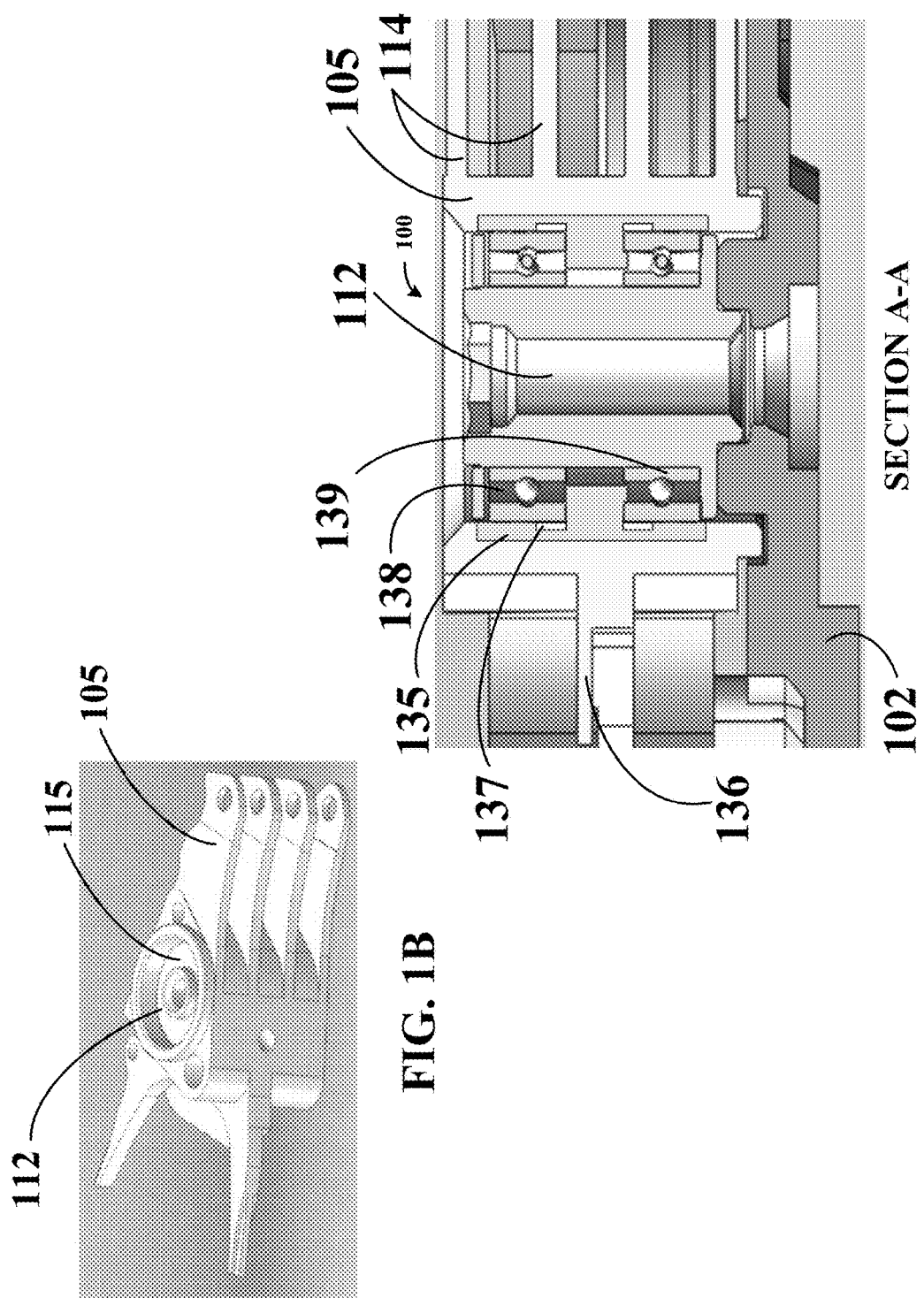

DISC DRIVE ACTUATOR BEARING CARTRIDGE ASSEMBLY WITH TEMPERATURE INDUCED ROTATIONAL TORQUE MITIGATION

BACKGROUND

Disc drives are used for data storage in a variety of modern electronic products, ranging from media players to computer systems and networks, and including centralized or cloud-type networks that operate to store data for a multitude of users. A disc drive may include a mechanical portion, or head disc assembly (HDA), and electronics in the form of a printed circuit board assembly (PCBA) mounted to an outer surface of the HDA. The PCBA controls HDA functions and provides an interface between the disc drive and its host. An HDA includes moving parts such as one or more storage mediums affixed to a spindle motor assembly for rotation, an actuator assembly supporting read/write transducers that traverse data tracks spaced across the storage medium surfaces, and a motor (often referred to as a voice coil motor (VCM)) providing rotational motion to the actuator assembly. In operation, the spindle motor rapidly rotates the storage mediums, and the VCM positions the read/write transducers above data tracks on the storage mediums to access (read and/or write) the data stored thereon.

SUMMARY

Various example embodiments of the present disclosure are directed to apparatuses and/or methods that mitigate rotational torque variation induced on an actuator assembly, which may be generated as a result of increased operational temperature. Various aspects are directed to an actuator assembly having a sleeve coupled between an e-block and an outer race of a bearing or bearings. The sleeve includes one or more grooves located along an inner diameter thereof, and adjacent an edge of the outer race. The groove or grooves are arranged with the outer race to mitigate rotational torque variation upon the disc drive actuator assembly by providing space, via the groove, for the outer race to deform relative to the sleeve.

According to an example embodiment, a disc drive actuator assembly is disclosed including an e-block, bearings, and a sleeve. The e-block facilitates read and write access of a plurality of storage mediums by positioning one or more transducers over the plurality of storage mediums. The bearing includes an inner race, an outer race and a plurality of balls between the inner and outer races. The inner race of the bearing is coupled to a pivot shaft of a disc drive while the sleeve couples the outer race of the bearing to the e-block, thereby facilitating rotation of the e-block around the pivot shaft via the bearing. The sleeve includes a groove along an inner diameter of the sleeve and located adjacent the outer race. The groove operates with the bearing to mitigate rotational torque variation upon the disc drive actuator assembly by allowing the outer race of the bearing to deform relative to the sleeve, at portions thereof adjacent the groove. This deformation may mitigate the introduction of forces that would otherwise act upon the bearing if the outer race were constrained. In further embodiments, the groove and the bearing mitigate or avoid forces induced by thermal expansion of the disc drive actuator assembly by deforming the outer race of the bearing relative to the groove, which may mitigate or avoid variations in rotational torque of the disc drive actuator assembly. Such induced forces may be associated with, for example, changes in external temperatures surrounding the disc drive and/or heat generated in the PCBA, in the e-block voice coil, and/or in the VCM during operation of the disc drive. Such thermal expansion forces may otherwise cause increases or decreases in rotational torque on the disc drive actuator assembly, which may inhibit read and write access performance of the disc drive.

Many embodiments of the present disclosure are directed to methods for mitigating rotational torque variation of a bearing in a disc drive apparatus having: a base deck including a pivot shaft, a disc drive actuator assembly that includes an e-block rotationally fixed relative to the base via the pivot shaft, a plurality of storage mediums, and a transducer coupled to the e-block for accessing data on the plurality of storage mediums. A bearing is provided with inner and outer races and a plurality of balls therebetween. The inner race of each bearing is coupled to the pivot shaft, and the outer race of the bearing is coupled to the e-block via a provided sleeve. Accordingly, the bearing facilitates rotation of the e-block relative the pivot shaft. A groove is provided along an inner diameter of the sleeve and adjacent at least a portion of the outer race, and is positioned relative to the outer race such that, during operation of the disc drive, rotational torque forces upon the bearing are maintained via deformation of the outer race relative to the sleeve.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 1B is a perspective view illustrating an e-block, consistent with various aspects of the present disclosure;

FIG. 1C is a cross-sectional view illustrating the e-block assembly of FIG. 1A, consistent with various aspects of the present disclosure;

DETAILED DESCRIPTION

Figure 1A:
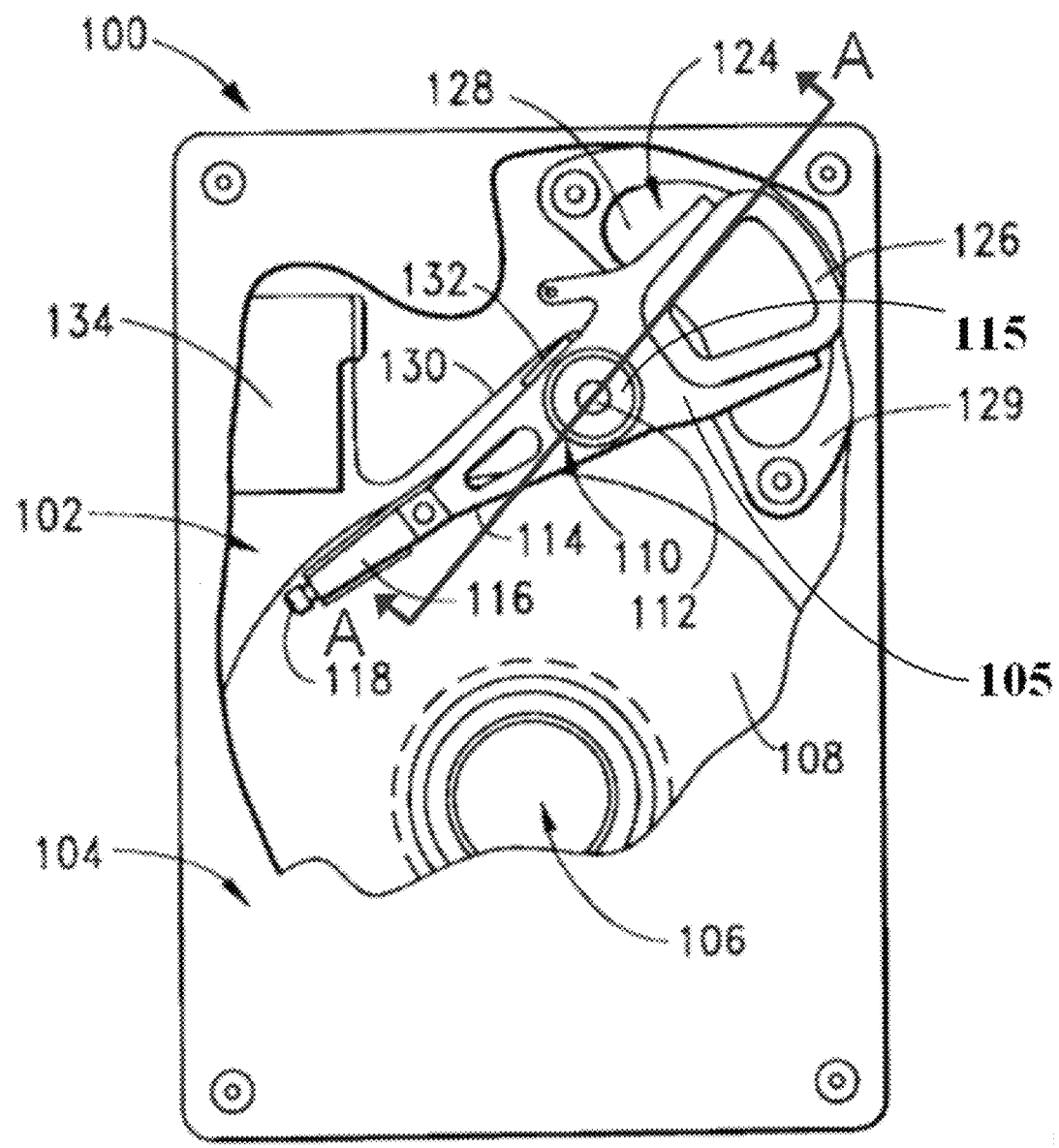
FIG. 1A is a top view of a disc drive, consistent with various aspects of the present disclosure.

Various example embodiments of the present disclosure are directed to apparatuses and/or methods that mitigate variation in rotational torque upon an actuator assembly in response to increased/decreased operational temperature. Such temperature variation may, for example be due (at least in part) to one or more of heat in an environment of the disc drive, heat generated in the PCBA, heat generated in the e-block voice coil, and heat generated in the VCM during operation of the disc drive. This temperature variation may cause thermal expansion or contraction of components of the disc drive actuator assembly. The actuator assembly is implemented with a bearing and sleeve, along with a groove in the sleeve that operates with the bearing to facilitate relative deflection of the bearing and sleeve under expansion or contraction conditions. This relative deflection mitigates temperature-induced increases or decreases in forces that may otherwise cause variations in the rotational torque. While not necessarily so limited, various aspects may be appreciated through a discussion of examples using such exemplary contexts.

Various aspects of the present disclosure operate to mitigate variations in torque by providing for expansion of an outer race of the bearings (relative to a sleeve coupled thereto). In various embodiments, a sleeve includes a groove located along an inner diameter thereof, and adjacent to the outer race of a bearing. This groove operates in conjunction with an outer race of a bearing to provide a space that allows expansion or contraction of the bearing or the sleeve, which can mitigate the generation of forces that may otherwise cause variations in rotational torque. As such, bearings and sleeves which may exhibit different thermal expansion properties can be used under conditions in which temperatures vary over a certain range, with the groove providing space for expansion or contraction that mitigates the generation of forces that may affect rotational torque.

One or more of embodiments may be particularly applicable, for example, to disc drives which include a VCM for rotating the actuator assembly. The VCM is sensitive to rotational torque variation during seek operations as a controller must continually vary the current induced through the VCM (for a given seek operation) to compensate for the varying rotational torque. While embodiments of the present disclosure are not necessarily limited to disc drive applications, various aspects may be appreciated through a discussion of examples using this context. In conjunction with one or more embodiments of the present disclosure, it has been discovered that rotational torque of an actuator assembly can be maintained within a range of about 10% of a target rotational torque during operation of a disc drive.

According to one or more embodiments, a disc drive actuator assembly includes an e-block, a bearing, and a sleeve, with the e-block facilitating read and write access to storage mediums by positioning one or more transducers over the storage mediums. The bearing includes an inner race, an outer race and a plurality of balls between the inner and outer races. The inner race of the bearing is coupled to a pivot shaft of a disc drive, around which the e-block rotates, and the sleeve couples the outer race of the bearing to the e-block. The sleeve includes a groove along an inner diameter thereof, which is arranged adjacent the outer race. The groove operates with the bearing to mitigate rotational torque variation upon the disc drive actuator assembly by providing space (the groove) in which the outer race of the bearing can deform relative to the sleeve, this deformation prevents (excess) forces from acting upon the outer race. In connection with one or more such embodiments, it has been recognized/discovered that the forces acting upon the outer race, during operation of the disc drive, are related to the operating temperature of the disc drive, and further that these forces can be mitigated (to maintain a generally consistent rotational torque of the disc drive actuator assembly) by allowing movement of an outer race of the bearing relative to the sleeve while maintaining operability thereof. If not addressed, these forces can greatly vary the rotational torque required to rotate the e-block relative the pivot shaft, which can adversely affect performance characteristics of the disc drive including seek times between data tracks. In these contexts, the groove and the bearing may operate to effectively absorb or prevent forces induced by thermal expansion/contraction, associated with variable operating temperature of the disc drive. For example, where the sleeve contracts relative to the outer race in response to a temperature change of the disc drive, the groove mitigates induced forces caused by the contraction by deforming the outer race into the groove. This deformation can effectively compensates for thermal displacement of the outer race in the ball contact area that would otherwise affect loads within the bearing, were the outer race constrained. This approach also mitigates problems that may occur with read and write access performance of the disc drive, were rotational torque to be increased/decreased as such.

In various embodiments, the groove and the outer race of the bearing mitigate changes in rotational torque in the bearing by compensating for thermal displacements of bearing components via deformation of the outer race into the groove, which would otherwise affect loads within the bearing and cause the bearing to exhibit a rotational torque that exceeds a target rotational torque limit for the bearing over a predefined operational temperature range. In more specific embodiments, the groove and the outer race maintain the rotational torque of the bearing within a set range (e.g., 10%) of a target rotational torque over a set/target operational temperature range of the disc drive, by mitigating thermal expansion-induced force. In particular, excess force exerted due to thermal expansion of the bearing is prevented via deformation of the outer race of the bearing into the groove. In connection with these aspects, it has also been recognized/discovered that variations in drag torque during high-speed rotation of the e-block, which can impact the time required to service read/write requests of the disc drive, can be mitigated via this deformation. Due to the various thermal expansion coefficients of components of the bearing, the induced forces (and resultant rotational torque of the bearing) may vary depending on the bearing temperature. Aspects of the present disclosure mitigate such rotational torque variation of the bearing and prevent related performance degradation of the disc drive.

Many embodiments employ a bearing with inner and outer races biased relative to inner and outer races of another adjacent bearing, using an induced mechanical force (e.g., as may commonly be known as "pre-loading"). Adjacent inner races are biased toward one another along a length of a pivot shaft and adjacent outer races are biased away from one another along the length of the pivot shaft. Pre-loading establishes a rotational torque of the e-block relative to the pivot shaft via the biased inner and outer races. In such an embodiment the groove and the bearings mitigate thermal expansion forces induced by increased disc drive operating temperature, by dissipating the induced thermal expansion forces through deformation of the outer race relative to the sleeve (e.g., under conditions in which the bearing and sleeve expand or contract differently). The deformation maintains the established rotational torque during operation of the disc drive within an acceptable range.

Various embodiments involve an adhesive that couples the outer race and the sleeve along portions of the sleeve adjacent the groove. The adhesive, the outer race, and the sleeve allow for deformation of portions of the outer race coupled to the sleeve via the adhesive. In such embodiments, the adhesive maintains coupling between the outer race and the sleeve at portions that it couples, therein allowing for relative deformation of the outer race at portions of the outer race adjacent the groove. For example, when the sleeve expands in response to increased operating temperature of the disc drive, the portion of the outer race adjacent the groove may deform (relatively) away from the groove while a portion of the outer race glued to the sleeve expands with the sleeve. This relative deformation operates to maintain a near-consistent rotational torque in the disc drive actuator assembly. In some embodiments, the sleeve maintains its shape in response to induced forces upon the sleeve under conditions in which the outer race deforms adjacent the groove. Accordingly, in such embodiments the outer race deforms adjacent the groove, but the sleeve does not deform in response to the induced forces.

Various example embodiments are directed to an apparatus including a base deck with a pivot shaft fixed relative thereto, storage mediums, and a disc drive actuator assembly. The disc drive actuator assembly includes a transducer, an e-block, and a bearing. The e-block positions the transducer over one of the storage mediums for accessing data locations therein. The bearing includes inner and outer races with balls therebetween, in which the inner race of each bearing is coupled to a pivot shaft of the disc drive, and with the bearing facilitating rotation of the e-block relative to the pivot shaft. The sleeve couples the outer race of the bearing to the e-block, and includes a groove along an inner diameter of the sleeve. The groove is adjacent at least a portion of the outer race and operates in conjunction with the bearing to mitigate rotational torque variation in the disc drive actuator assembly by, for example, deforming the outer race of the bearing into the groove or otherwise providing a region at which the outer race is not coupled to the sleeve. This mitigates induced forces upon the bearing which may otherwise result in variation of the rotational torque in the disc drive actuator assembly.

Many embodiments of the present disclosure are directed to methods for mitigating rotational torque variation of a bearing in a disc drive apparatus having: a base deck including a pivot shaft, a disc drive actuator assembly that includes an e-block rotationally fixed relative to the base via the pivot shaft, storage mediums, and a transducer coupled to the e-block for accessing data on the storage mediums. The method includes providing a bearing having inner and outer races and a plurality of balls therebetween. The inner race of each bearing is coupled to the pivot shaft, and the outer race of the bearing is coupled to the e-block via a provided sleeve. Accordingly, the bearing facilitates rotation of the e-block relative the pivot shaft. A groove is positioned along an inner diameter of the sleeve and adjacent at least a portion of the outer race such that, during operation of the disc drive, variations in rotational torque in the bearing are mitigated by providing a space in which the outer race may deform or otherwise permitting expansion of the sleeve (at the groove) away from the outer race.

Turning now to the figures, FIG. 1A shows a disc drive 100 constructed in accordance with an embodiment of the present disclosure. The disc drive 100 mitigates rotational torque variation in a bearing within a cartridge bearing assembly 115, as may be associated with thermal expansion or contraction of components of the bearing. Such variable rotational torque may reduce seek performance of the disc drive 100. For instance, environmental temperatures, or heat generated in PCBA, e-block voice coil, and VCM may cause changes in temperature that may cause the components of the cartridge bearing assembly 115 to thermally expand or contract. This expansion/contraction may alter forces applied upon the bearing and therein cause variations in rotational torque required to rotate c-block 105 relative to pivot shaft 112. These variations may reduce seek performance of the disc drive. The present disclosure mitigates performance degradation of the disc drive caused by rotational torque variation of the bearing by allowing an outer race of the bearing and a coupled sleeve to deform relative to one another, therein mitigating the generation of forces upon the outer race that may otherwise induce variation in the rotational torque of the e-block 105.

The disc drive 100 can be implemented in a variety of manners. By way of example, the disc drive 100 is shown including a base deck 102 to which various components of the disc drive 100 are mounted. A top cover 104 (shown in partial cutaway fashion) and the base deck 102 are coupled together to form a sealed atmospheric environment for the disc drive 100. A spindle motor (shown generally at 106) rotates one or more storage mediums 108 at a constant (or about constant) high speed. Information is accessed (written to and/or read) via tracks on the storage mediums 108 through the use of an actuator assembly 110 including an e-block 105. The e-block 105 rotates about a pivot shaft 112 using a cartridge bearing assembly 115. The e-block 105 is positioned adjacent to the storage mediums 108, allowing the e-block and attached transducer 118 to pivot and access data across the entirety of the storage mediums 108.

The actuator assembly 110 includes a plurality of actuator arms 114 that extend towards the storage mediums 108, with one or more flexures (suspensions) 116 extending from each of the actuator arms 114. Mounted at the distal end of each of the flexures 116 is a transducer 118 which includes a slider assembly (not separately designated) designed to enable the transducer 118 to fly in close proximity to the corresponding surface of the associated storage medium 108.

The radial position of the transducer 118 over the storage mediums 108 is controlled through the use of a VCM 124, which typically includes a coil 126 attached to the actuator assembly 110, as well as one or more permanent magnets 128 and corresponding magnetically permeable pole-pieces 129 which establish a magnetic field in which the coil 126 is immersed. A controller applies current to the coil 126, based on a desired location of the transducers 118 over the storage mediums 108, which causes a magnetic interaction between the magnetic field of the VCM 124 and electromagnetic fields induced in the coil 126. Based on the magnetic interaction the coil 126 moves in accordance with the well-known Lorentz relationship. As the coil 126 moves, the actuator assembly 110 pivots about the pivot shaft 112 and the transducers 118 are moved across the surfaces of the storage mediums 108. In performance focused disc drive applications, the electrical current of the coil 126 is rapidly changed in order to maximize disc seek velocity and minimize latency between a read/write request to the disc drive and fulfillment of the request. It has been discovered that a change of ambient temperature around the disc drive 100 can greatly increase/decrease the operating temperature of the actuator assembly 110. As discussed above, such variable temperature causes thermal expansion or contraction of components of the cartridge bearing assembly 115 which can vary the rotational torque necessary to move the transducers 118 to a particular location over the storage mediums 108. This varying rotational torque impacts seek performance of the disc drive 100 and in some cases requires sophisticated torque compensating algorithms to minimize the seek performance effect of such varying rotational torque. Aspects of the present disclosure mitigate the rotational torque variation and negate the need for such torque compensating algorithms.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the transducers 118. The printed circuit board 132 typically includes circuitry for controlling the write currents applied to the transducers 118 during a write operation and for amplifying read signals generated by the transducers 118 during a read operation. The flex assembly terminates at a flex bracket 134 for communication through the base deck 102 to a disc drive printed circuit board (not shown) mounted to the bottom side of the disc drive 100. The flex assembly 130 in conjunction with varying rotational torque induced by the cartridge bearing assembly 115 can increase the required current applied to the coil 126 to rotate the e-block 105 relative to the base deck 102. Aspects of the present disclosure are directed to reducing power draw of the disc drive 100 by maintaining a desired rotational torque that may reduce/minimize current draw required by the coil 126 for seek operations (for the case of torque increase).

Referring now to FIG. 1B, shown therein is a perspective view of an e-block 105 consistent with an exemplary embodiment of the present disclosure. The e-block 105 includes a cartridge-bearing assembly 115 installed in the e-block 105. The bearings of the cartridge-bearing assembly 115 are coupled to a pivot shaft 112, rotationally coupling the e-block 105 to the pivot shaft 112. The cartridge-bearing assembly 115 housing a plurality of ball bearings enables the rotation of the e-block 105 about the pivot shaft 112.

FIG. 1C is a partial cross-sectional view illustrating a disc drive 100. Base deck 102 of disc drive 100 is coupled to pivot shaft 112. The pivot shaft 112 rotationally couples e-block 105 via a bearing cartridge assembly including a plurality of bearings 138 and a sleeve 135 that applies a pre-load to outer races of the bearings 138 and 139 relative to the inner races. In this context, the bearing 138 provide upper inner and outer races, and bearing 139 provides lower inner and outer races. The sleeve 135 is coupled to e-block 105 which includes a mount 136 for attaching a coil for a voice coil motor and actuator arms 114 for attaching transducers for accessing data on a storage medium. During operation of the disc drive 100, the voice coil motor drives the e-block 105 to rotate about the pivot shaft 112 at a high rate of speed while accessing various areas of the storage medium. The bearings 138 receive/emit thermal energy in response to external sources such as an atmospheric temperature external the disc drive 100, heat generated in a PCBA, heat generated in the e-block voice coil, and heat generated in the VCM. Changes in temperature of the bearings 138 and the sleeve 135 may sufficient to cause thermal expansion/contraction of these components that may be different, such as where the bearings and the sleeve are constructed of different materials.

Accordingly, different thermal expansion coefficients of each material may result in forces being induced upon certain components of the bearings 138. For example, where the outer race of the bearing 138 has a lower thermal expansion coefficient than the sleeve 135, a temperature decrease causes contraction of the sleeve relative to the outer race which may induce an increased radial force on both the bearing components. This varying temperature-dependent radial force on the bearing components may result in a variable rotational torque of the bearings 138. As a result, a servo control for the voice coil motor may need to vary the drive current for the coil to compensate for this variable rotational torque. However, in some implementations the servo control may be unable to completely compensate for this variable rotational torque, which results in reduced seek performance of the disc drive 100. Further, it may be desirable to avoid servo control compensation. As such, aspects of the present disclosure solve this problem using grooves 137 in the inner wall of the sleeve 135, which allow relative movement of the outer race of the bearing 138 and the sleeve 135 at the groove 137, be that deformation of the outer race into the groove or separation of the outer race and sleeve at the groove. Relative deflection of the outer race of the bearing 138 mitigates a portion of induced forces, to maintain a near constant rotational torque of the bearing 138 during operation of the disc drive 100. As a result, the rotational torque may be maintained within a range of about 10% of optimal rotational torque during disc drive operation. The consistent rotational torque allows for increased servo control seek time performance reliability throughout operation of the disc drive 100 and diminishes the need for adaptive algorithms in the servo control to address such rotational torque variation of the bearings 138.

Figure 2:
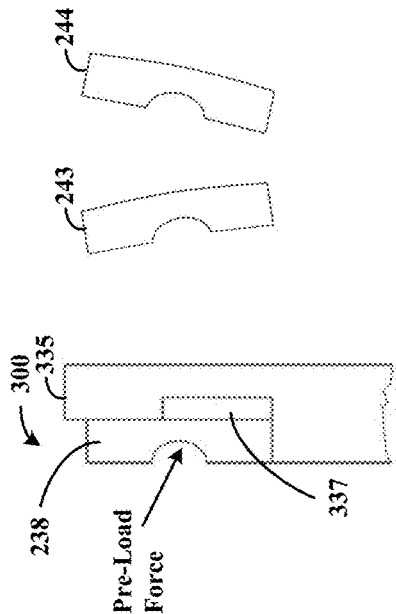
FIG. 2 shows a cross-sectional view illustrating an e-block assembly embodiment with a small groove, consistent with various aspects of the present disclosure.

FIGS. 2-5 are partial cross-sectional views illustrating exemplary embodiments of various e-block assemblies 200, 300, 400 and 500 with a common bearing 238 and sleeves 235, 335, 435 and 535 having varied groove positions at 237, 337, 437 and 537. In FIG. 2, an outer race 238 of a bearing is shown coupled to a sleeve 235, such as by using an adhesive. During assembly, a pre-load force may be applied between an inner race and the outer race 238, with the resulting force vector on the outer race 238 shown in each figure.

During operation of the disc drive, variations in temperature may cause the sleeve 235 and the outer race 238 to expand or contract differently, particularly where the components of the bearing are constructed of different materials. The varying thermal expansion coefficients of the material may result in changes in force induced on the bearing. For example, under conditions in which the coefficient of thermal expansion of the sleeves are is higher than that of the outer race 238, the sleeves will contract more than the outer race in response to a drop in temperature, and will expand more than the outer race in response to a rise in temperature. Accordingly, the outer race is shown under such conditions with a drop in temperature at 241, 243, 245 and 247, and with a rise in temperature at 242, 244, 246 and 248. The outer races thus move relative to the sleeves where the respective gaps are located, while the portions of the outer races glued to the sleeves moving with the sleeves. Where the coefficients of thermal expansion of the sleeves are lower than that of the bearing, an opposite relative deflection occurs. In addition, while deformation of the outer race 238 is shown, the sleeves also deform accordingly.

Figure 3:
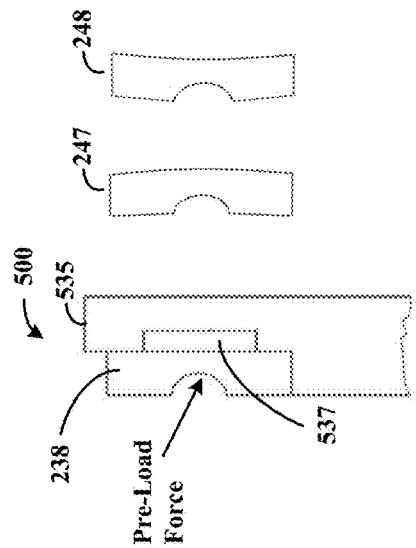
FIG. 3 shows a cross-sectional view illustrating an e-block assembly embodiment with a larger groove, consistent with various aspects of the present disclosure.

Each of the respective embodiments in FIGS. 2, 3, 4 and 5 are shown with different grooves, with changes in groove length and location affecting the relative race deformation amount and shape. For example, a larger race tilt is shown in FIG. 3, relative to FIG. 2. Further, changes in shape and dimensions of the outer race 238 may affect contact angle as well as major and minor axes of a contact region (ellipse). The deformation in this regard may be controlled accordingly. Furthermore, in some embodiments the sleeve 235 is relatively rigid and does not deform in response to the induced force on the outer race 238, with the outer race 238 deflecting into or away from the groove 237.

Figure 4:
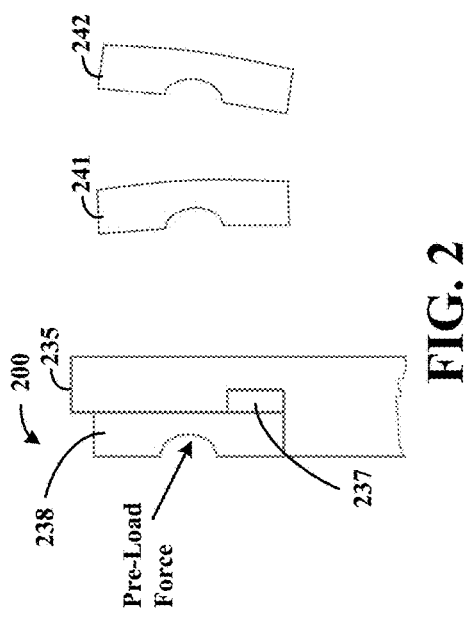
FIG. 4 shows a cross-sectional view illustrating an e-block assembly embodiment with dual grooves, consistent with various aspects of the present disclosure.
Figure 5:
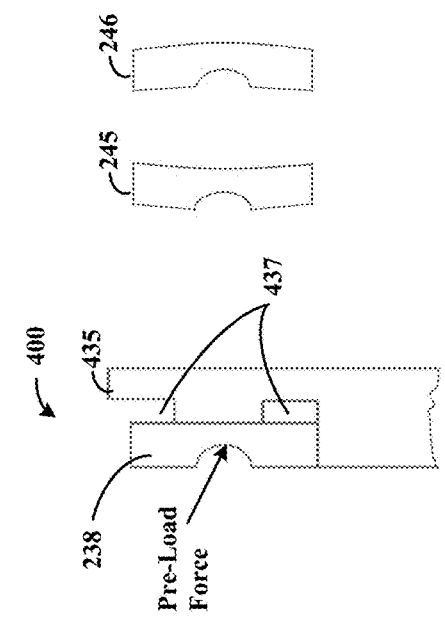
FIG. 5 shows a cross-sectional view illustrating an e-block assembly embodiment with a centralized groove, consistent with various aspects of the present disclosure While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

As noted above, various groove sizes and placement can affect deformation. For instance, the enlarged groove 337 in FIG. 3 allows for increased deflection of the outer race 238 during periods of induced force. Due to the enlarged groove 237, the deflection of the outer race 238 in such an embodiment may require less induced force for relative deflection to occur. FIG. 4 shows two groove positions at 437, which allows for increased deflection of the outer race 238 along a natural "u-shaped" deflection curve, as shown by exemplary deformed outer races 245 and 246. FIG. 5 shows a centralized groove 537, which also facilitates a "u-shaped" deflection curve, as shown by exemplary deformed outer races 247 and 248.

Based upon the above discussion and illustrations, those skilled in the art will readily recognize that various modifications and changes may be made to the various embodiments without strictly following the exemplary embodiments and applications illustrated and described herein. For example, it is to be understood that a groove in a sleeve of an actuator assembly may take a number of forms based on the desired rotational torque profile throughout an operational temperature range of a disc drive. Specifically, depending on the intended application(s) of the disc drive, the groove may be deeper to alleviate large deflections of the outer race caused by applications with large temperature variations. In other applications with less extreme temperature fluctuations, but that require near constant rotational torque characteristics to maintain performance characteristics during operation, wider grooves may be utilized to allow for deflections of the outer race associated with small temperature-related expansions/contractions of the bearings. The shape, depth, and location of the groove may take a variety of forms to solve problems related to rotational torque variation mitigation and other disc drive performance concerns. Such modifications do not depart from the true spirit and scope of various aspects of the invention, including aspects set forth in the claims.

What is claimed is:

1. A disc drive actuator assembly comprising:
   an e-block including one or more actuator arms;
   a bearing including an inner race, an outer race and a plurality of balls between the inner and outer races, the inner race being coupled to a pivot shaft of a disc drive, the bearing being configured and arranged to facilitate rotation of the e-block around the pivot shaft; and
   a sleeve coupling the outer race of the bearing to the e-block, the sleeve including a groove along an inner diameter of the sleeve and adjacent the outer race, the groove being configured and arranged with the bearing to facilitate deformation of the outer race of the bearing relative to the sleeve.

2. The disc drive actuator assembly of claim 1, wherein the groove is configured and arranged with the bearing to mitigate rotational torque variation upon the disc drive actuator assembly via the relative-deformation of the outer race of the bearing and the sleeve.

3. The disc drive actuator assembly of claim 1, wherein
   the outer race has a coefficient of thermal expansion that is different than a coefficient of thermal expansion of the sleeve, and
   the groove is configured and arranged with the bearing to mitigate the generation of forces induced by thermal expansion or thermal contraction of the disc drive actuator assembly, associated with the different coefficients of thermal expansion and changes in temperature during operation of the disc drive, by deforming the outer race of the bearing relative to the sleeve.

4. The disc drive actuator assembly of claim 1, wherein the groove is configured and arranged with the outer race of the bearing to limit rotational torque variation in the bearing to a target rotational torque over a predefined operational temperature range, by facilitating relative deformation of the outer race of the bearing and the sleeve under thermal expansion and thermal contraction conditions corresponding to upper and lower limits of the temperature range.

5. The disc drive actuator assembly of claim 1, wherein the groove is further configured and arranged with the outer race to maintain rotational torque of the bearing within 10% of a target rotational torque over a target operational temperature range of the disc drive, by mitigating forces generated due to thermal expansion via the relative deformation of the outer race of the bearing and the sleeve.

6. The disc drive actuator assembly of claim 1, wherein
   the inner and outer races of the bearing are biased relative to inner and outer races of another adjacent bearing, the adjacent inner races being biased toward one another along a length of the pivot shaft and the adjacent outer races being biased away from one another along the length of the pivot shaft,
   the inner and outer races are configured and arranged to establish a rotational torque of the e-block relative to the pivot shaft via the biased adjacent inner races and the biased adjacent outer races, and
   the groove is configured and arranged with the bearings to mitigate the generation of forces due to increased bearing temperature via deformation of the outer race adjacent the groove.

7. The disc drive actuator assembly of claim 1, further including an adhesive that couples surfaces of the outer race and the sleeve adjacent the groove, the coupled surfaces being configured and arranged to expand and contract together while surfaces of the outer race and the groove deform relative to one another.

8. The disc drive actuator assembly of claim 1, wherein
   the sleeve exhibits a first coefficient of thermal expansion;
   the bearing exhibits a second coefficient of thermal expansion that is different than the first coefficient of thermal expansion, whereby expansion and contraction of the bearing is different than expansion and contraction of the sleeve under common temperature conditions; and
   the outer race and groove are designed to mitigate the generation of forces induced by said different expansion and contraction of the bearing, relative to the expansion and contraction of the sleeve.

9. The disc drive actuator of claim 1, wherein the sleeve is configured and arranged to maintain shape in response to induced forces upon the sleeve under conditions in which the outer race deforms adjacent the groove.

10. An apparatus comprising:
    a base deck including a pivot shaft fixed relative to the base deck;

a plurality of storage mediums; and
a disc drive actuator assembly including
   a transducer configured and arranged to access data storage locations on one of the plurality of storage mediums,
   an e-block configured and arranged to position the transducer over the one of the plurality of storage mediums, and
   a bearing including inner and outer races and a plurality of balls therebetween, the inner race of each bearing coupled to a pivot shaft of the disc drive, and the bearing configured and arranged to facilitate rotation of the e-block around the pivot shaft; and
   a sleeve coupling the outer race of the bearing to the e-block, the sleeve including a groove along an inner diameter of the sleeve and adjacent at least a portion of the outer race, the groove being configured and arranged with the bearing to mitigate rotational torque variation upon the disc drive actuator assembly by allowing the outer race of the bearing to deform relative to the sleeve.

11. The apparatus of claim 10, wherein the sleeve is further configured and arranged with the bearing to mitigate the generation of forces induced by thermal expansion and contraction of the disc drive actuator assembly, associated with changes in temperature during operation of the disc drive, by deforming the outer race of the bearing relative to the groove.

12. The apparatus of claim 10, wherein the sleeve is configured and arranged with the outer race of the bearing to mitigate changes in rotational torque in the bearing by mitigating thermally induced forces in the outer race, exceeding a target rotational torque of the bearing over a predefined operational temperature range, via deformation of the outer race relative to the groove.

13. The apparatus of claim 10, wherein the groove is further configured and arranged with the outer race to maintain the rotational torque of the bearing within 10% of a target rotational torque over a target operational temperature range of the disc drive, by compensating or preventing excess force induced via thermal expansion or contraction of the disc drive actuator assembly.

14. The apparatus of claim 10, wherein
the sleeve has a coefficient of thermal expansion that is different than a coefficient of thermal expansion of the bearing, and
the groove is configured and arranged with the sleeve and the bearing to mitigate the generation of forces induced by disparate thermal expansion or thermal contraction characteristics of the sleeve and of the bearing, by deforming the outer race of the bearing relative to the sleeve.

15. The apparatus of claim 10, wherein the sleeve is configured and arranged to maintain shape in response to induced forces upon the sleeve under conditions in which the outer race deforms relative to the groove.

16. A method for mitigating rotational torque variation of a bearing in a disc drive apparatus having a base deck including a pivot shaft, a disc drive actuator assembly that includes an e-block rotationally fixed relative to the base via the pivot shaft, a plurality of storage mediums, and a transducer coupled to the e-block for accessing data on the plurality of storage mediums, the method comprising:
   providing a bearing having inner and outer races and a plurality of balls therebetween, the inner race of each bearing coupled to the pivot shaft and the bearing being configured and arranged to facilitate rotation of the e-block around the pivot shaft;
   providing a sleeve coupling the outer race of the bearing to the e-block; and
   providing a groove along an inner diameter of the sleeve and adjacent at least a portion of the outer race, and positioning the groove relative to the outer race such that, during operation of the disc drive, varying rotational torque forces upon the bearing are mitigated via deformation of the outer race relative to the groove.

17. The method of claim 16, further including mitigating changes in rotational torque in the bearing by mitigating thermally induced forces in the outer race, exceeding a target rotational torque of the bearing over a predefined operational temperature range, via deformation of the outer race relative to the groove.

18. The method of claim 16, further including maintaining the rotational torque of the bearing within 10% of a target rotational torque over a target operational temperature range of the disc drive, by compensating or preventing excess force induced via thermal expansion of the disc drive actuator assembly by deforming the outer race of the bearing relative to the groove.

19. The method of claim 16, wherein
the outer race and the sleeve have different coefficients of thermal expansion, and
positioning the groove includes positioning the groove relative to the outer race, thereby mitigating the generation of forces induced by disparate thermal expansion or thermal contraction of the outer race relative to sleeve, by deforming the outer race of the bearing relative to the groove.

20. The method of claim 16, further including maintaining a shape of the sleeve in response to induced forces upon the sleeve under conditions in which the outer race deforms into the groove.

* * * * *